Oct. 14, 1952        C. M. JONES        2,613,532

INSTRUMENT FOR DETERMINING WHEEL BALANCE

Filed April 13, 1948        4 Sheets-Sheet 2

Clarence M. Jones
INVENTOR.

BY Philip A. Terrell
ATTORNEYS.

Oct. 14, 1952 C. M. JONES 2,613,532
INSTRUMENT FOR DETERMINING WHEEL BALANCE
Filed April 13, 1948 4 Sheets-Sheet 3
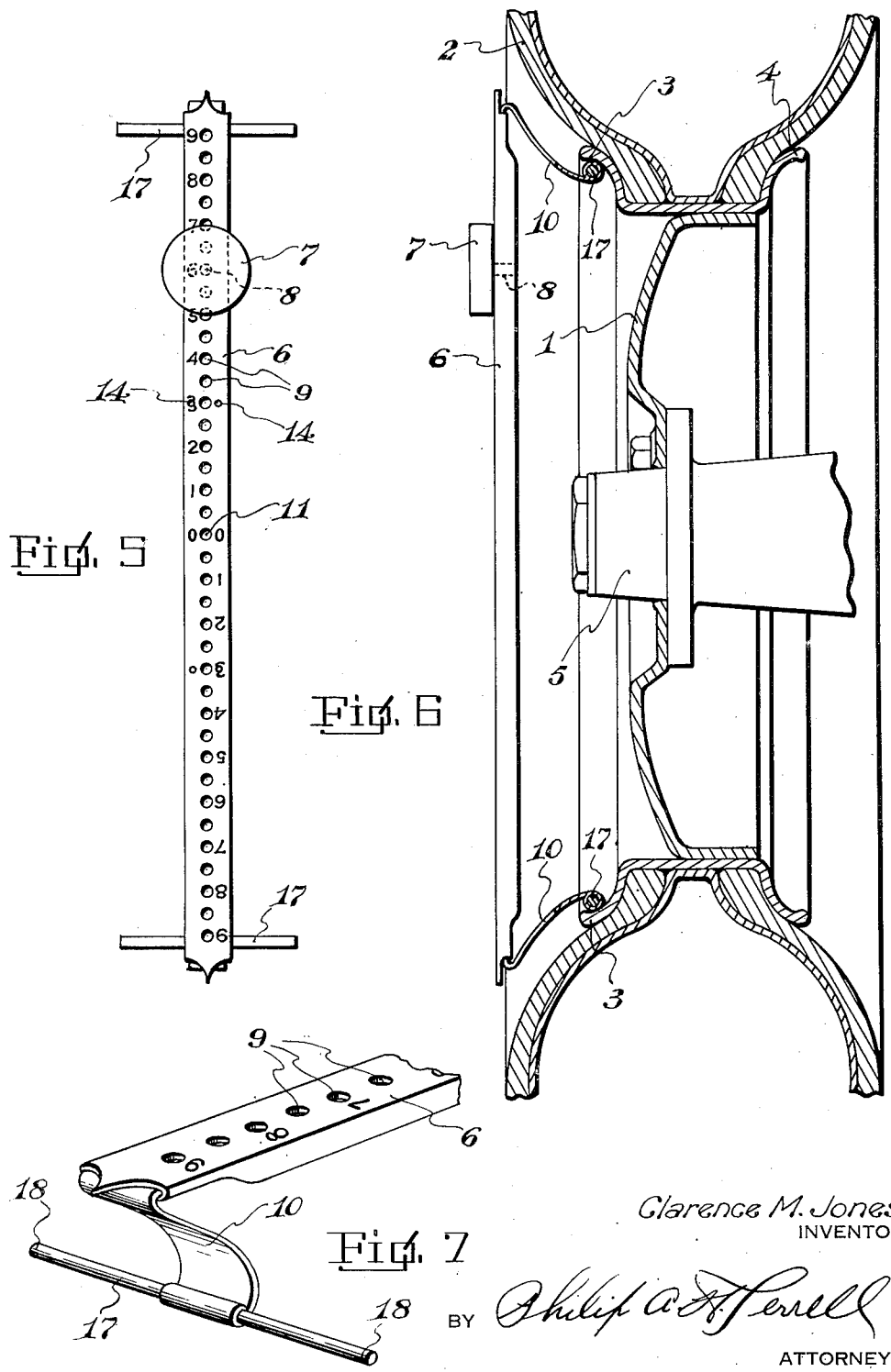

Oct. 14, 1952 C. M. JONES 2,613,532
INSTRUMENT FOR DETERMINING WHEEL BALANCE
Filed April 13, 1948 4 Sheets-Sheet 4
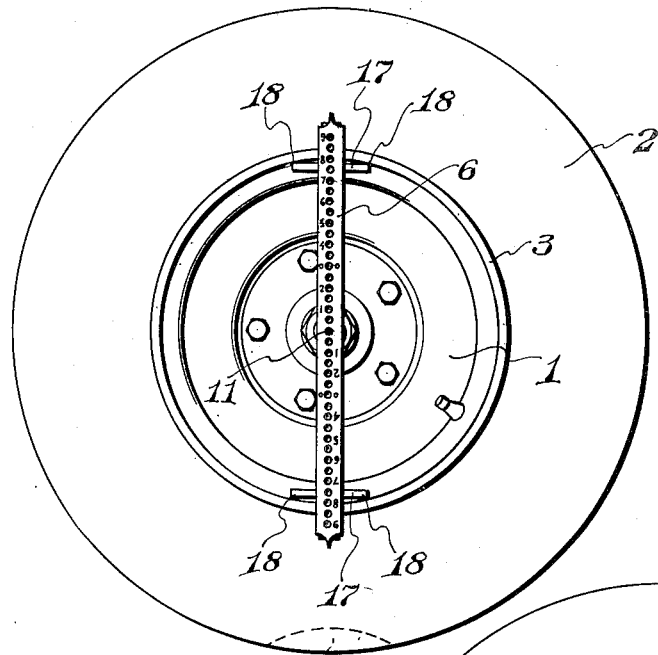
Fig. X
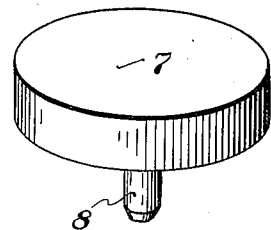
Fig. 10
Fig. 9
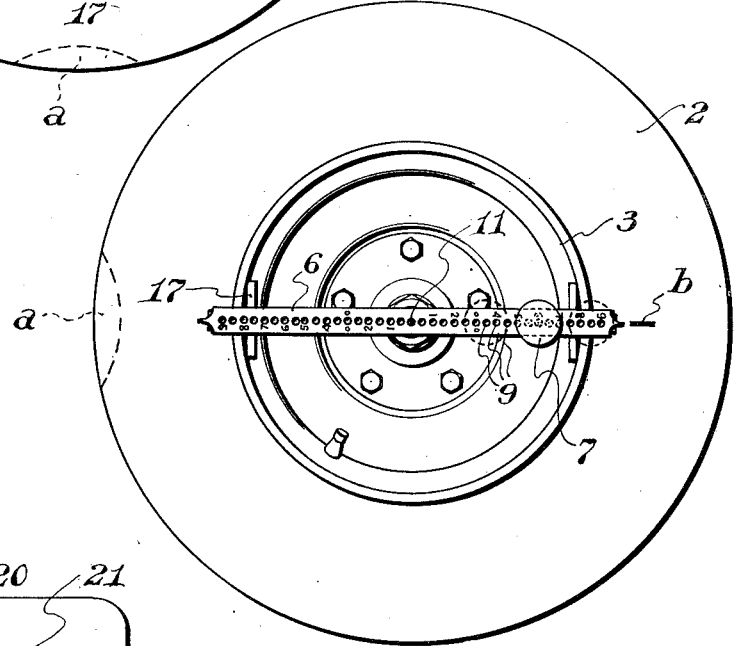
Fig. 11
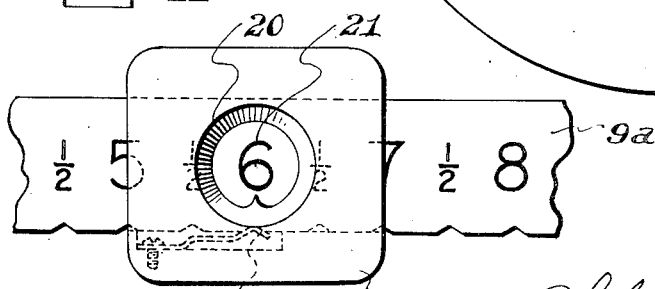
Clarence M. Jones
INVENTOR.
BY Philip C. H. Terrell
ATTORNEYS.

Patented Oct. 14, 1952

2,613,532

UNITED STATES PATENT OFFICE 2,613,532

INSTRUMENT FOR DETERMINING WHEEL BALANCE

Clarence M. Jones, Tulsa, Okla.

Application April 13, 1948, Serial No. 20,653

5 Claims. (Cl. 73—66)

The invention relates to instruments adapted to be applied to the side of a vehicle wheel after the distributed weight or off-balance weight of the wheel has gravitated to the lower side thereof, and constructed in a manner whereby when the instrument is rotated to a horizontal position, the adjustable weight may be adjusted outwardly on the device in a position opposite the over balance which has been moved to one side, to establish the amount of weight necessary to be applied to the wheel opposite the distributed weight for balancing the wheel against the distributed weight.

A further object is to provide a balance establishing instrument which will not only balance against the distributed weight in the tire structure, but also against the weight of off-balance in the wheel hub, rim and brake drum, or all combined.

A further object is to provide yieldable supporting arms carried by the instrument and adapted to engage within the clincher flange of the wheel rim for attaching the instrument to the wheel in a position across and at a right angle to the axis of the wheel.

A further object is to provide a removable cross arm on the main bar, and having indicating edges so the circumference of the wheel can be divided into three equal segments of 120 degrees, thereby establishing the couple points in relation to the distributed off-balance which has previously gravitated to the lower side.

A further object is to form the couple establishing arm with outwardly and oppositely inclining arms to adapt themselves to the dished form and side of the tire and disc wheel.

A further object is to provide the main body of the device with spaced apertures having weight values for the reception of a weight member; also with apertures for receiving and supporting the cross arm.

A further object is to position the marker guide edges of the cross arm at sixty degrees in alinement with the zero center of the main bar so the device can be used in connection with wheels of different diameter.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 5 is a view in elevation of the device, with the cross arm removed where diametric balancing only is desired.

Figure 6 is a transverse sectional view through a conventional form of wheel assembly, showing the device applied thereto.

Figure 7 is an enlarged perspective view of one end of the device shown in Figure 5.

Figure 8 is a side elevation of a wheel assembly showing the device applied thereto, after the distributed weight has gravitated to the lower position, and the wheel jacked off the ground.

Figure 9 is a view similar to Figure 8, but showing the wheel turned to a position where the distributed weight and the device is in a horizontal position, so the operator can make a mark showing the position to apply a conventional balance weight, after the counter-balancing operation.

Figure 10 is a perspective view of the counterbalancing weight.

Figure 11 is a modified form of weight, slidable on the body member.

Figure 1:
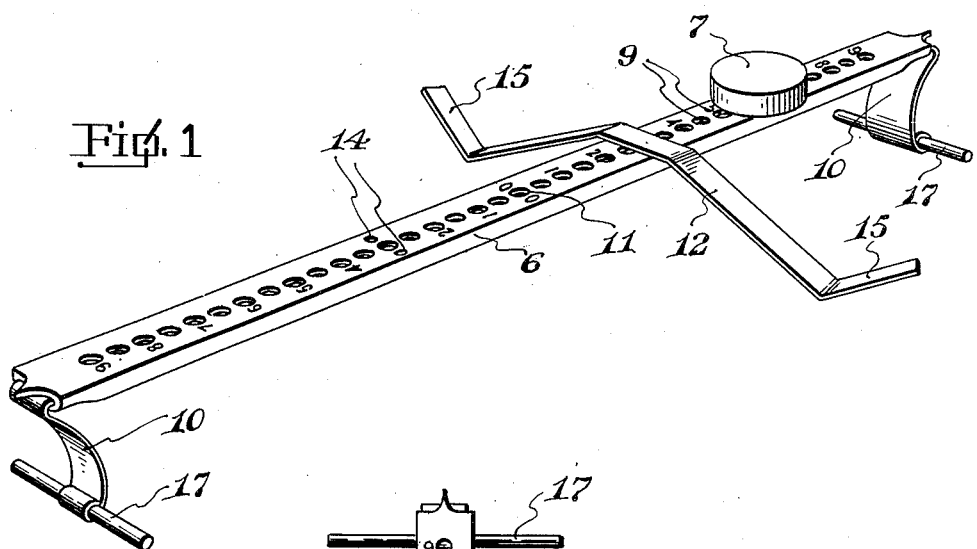
Figure 1 is a perspective view of the device.
Figure 2:
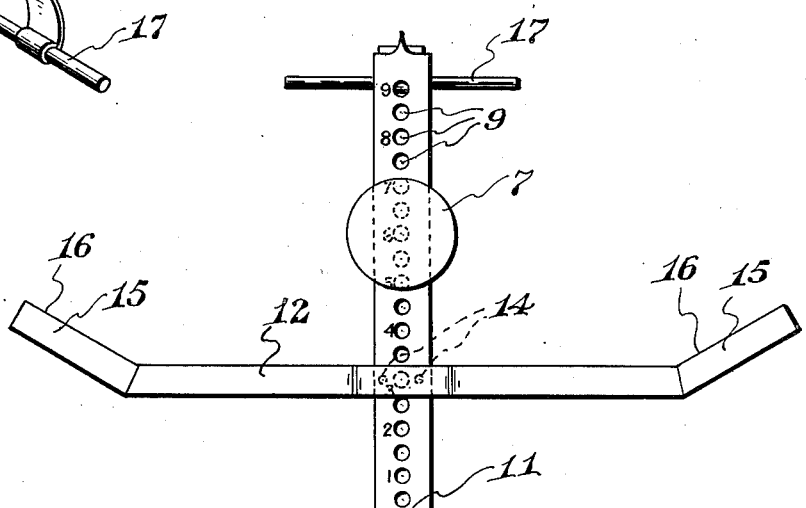
Figure 2 is a front elevation.

Referring to the drawings, the numeral 1 designates a disc wheel having a tire 2 thereon, held between the rim flanges 3 and 4 in the usual manner. The disc wheel is of conventional structure and varies according to source of manufacture, and is carried by the hub sleeve 5, in which is mounted the usual roller bearings on a spindle.

Figure 3:
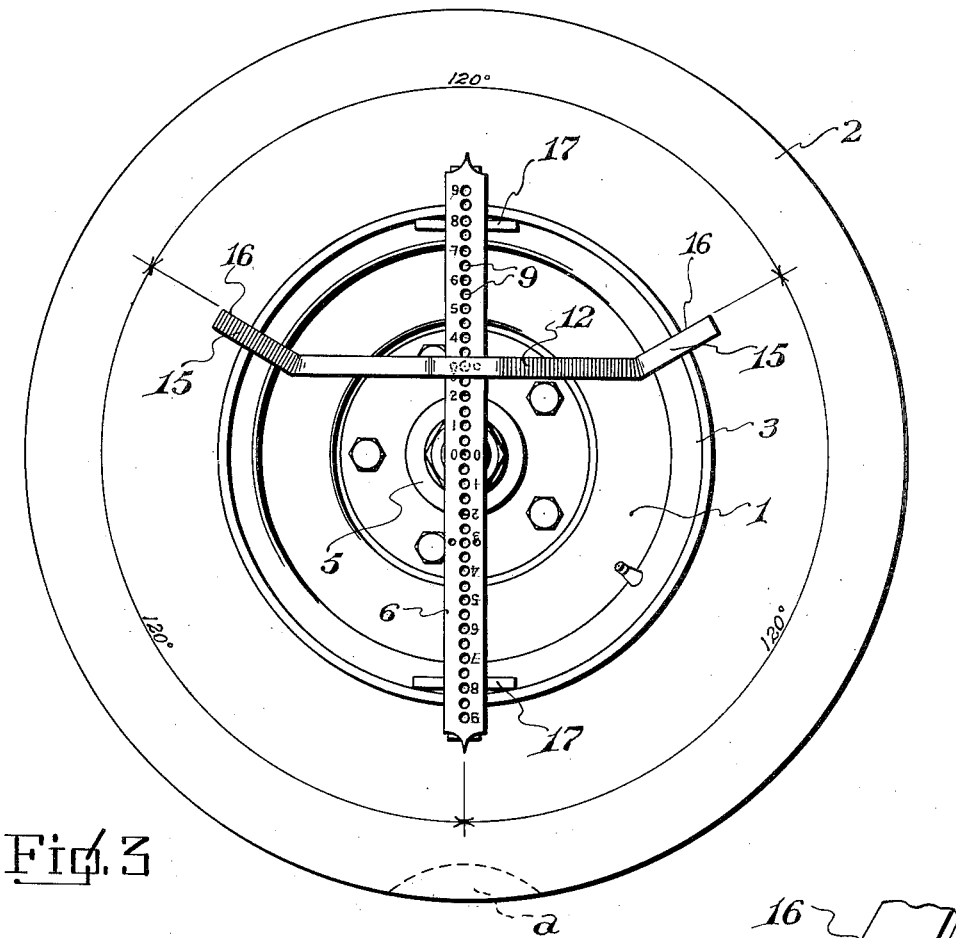
Figure 3 is a front elevation of the device, showing the device applied to a conventional form of wheel assembly.
Figure 4:
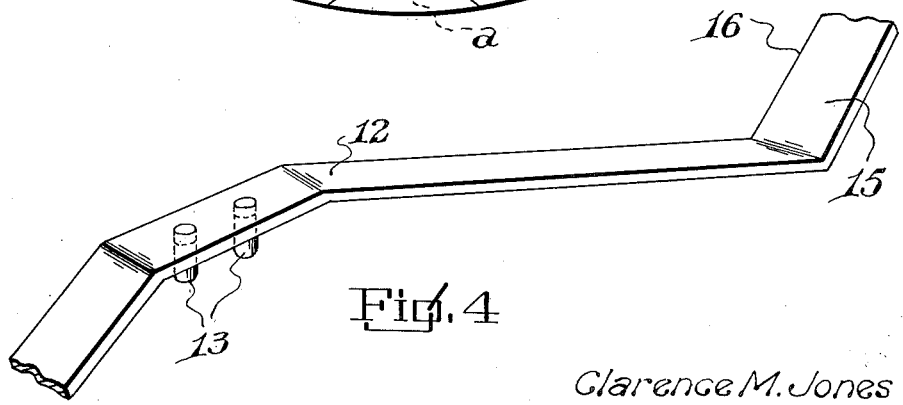
Figure 4 is a detail perspective view of a portion of the removable cross arm.

Heretofore, in most balancing machines, it has been necessary to remove the disc wheel and place the wheel in a balancing machine, usually in a horizontal position on a balance point. In the present device the wheel is balanced on the vehicle, and all that is necessary is to jack the wheel clear of the ground so the distributed over-balanced weight $a$ is downwardly disposed, as shown in Figure 3. After the wheel assumes the position shown in Figure 3, the graduated body member 6 is placed in the wheel in a vertical position and at a right angle across the axis of the wheel. Following this, the wheel is rotated ninety degrees to a horizontal position, as shown in Figure 9, and this operation will bring the distributed weight $a$ to the position shown in Figure 9. Then the counterweight 7, which is provided with a pin 8, is adjusted to a position on the body member 6 where the distributed weight is counter-balanced in a horizontal position. The operator then makes a mark b on the tire to show the position to place the rim weight, as indicated on the graduation of the body member on the rim flange 3 for the balancing operation. Counterweight 7 is adjusted by inserting its pin 8 in any of the graduated apertures 9 in the body member. The above is a description of what is known as diametrical counterbalancing.

The body member is held in position by yieldable spring arms 10, which arms spring outwardly from the ends of the body member into frictional gripping engagement with the inner periphery of the flange 3, therefore it will be seen that by providing yieldable arms the device may be applied to wheels of different diameter, and in a manner whereby the central zero aperture 11 will be on the axis of the wheel.

Where it is desired to balance the wheel against what is known as a couple, a cross bar 12 is provided. Cross bar 12 arches outwardly and is held in position, when in use, by spaced lugs 13, which lugs are received in spaced apertures 14 of the body member 6. Apertures 14, during all measurements, are used for supporting the cross bar, irrespective of the diameter of the wheel. The outer ends of the cross bar 12 terminate in radial arms 15, the marker guide edges 16 of which are at sixty degrees from the central zero aperture 11, hence edges 16 are at one hundred and twenty degrees from each other, and as the cross bar 12 is at a right angle to the body 6, it is obvious the circumference is divided into three equal parts of one hundred and twenty degrees. When balancing against a couple the distributed weight is in the lower position as shown in Figure 3, then the device is applied to the wheel, as shown in Figure 3, and marks made on the wheel along the guide edges 16 for establishing the three point positions of the distributed weight and positions for applying the proper weights after the balancing operation. Following this operation the cross bar 12 is removed from the body member 6, then the wheel is rotated ninety degrees until the body member 6 is in a horizontal position, and then the weight 7 is applied in any of the apertures 9 until the off balanced weight, which may be in the tire or wheel assembly is counterbalanced. This adjustment of the weight is inwardly or outwardly in relation to the axis of the wheel and the zero marking 11 of the member 6. The indicia along the holes 9 will indicate the proper size of weight to be applied to the positions previously marked on the wheel. It is to be understood that the full indicated weight is applied to each of the previously marked positions.

Extending transversely through the ends of the spring arms 10 are rods 17, the ends 18 of the rods engage within the rim flange 3, consequently there is a centering across the axis by a four point suspension, which will prevent side displacement.

Referring to Figure 11, the body member 6 is provided with a slidable counterweight 19 having a sight opening 20 therethrough so the operator can read the graduations 21 through the sight opening as the counterweight is adjusted inwardly or outwardly. A spring detent 22, is preferably provided for holding the counterweight against easy displacement from an adjusted position.

From the above it will be seen that an unbalance device is provided, whereby the amount of weight necessary to balance a wheel assembly may be easily established, as well as the positions for applying the weights for the balancing operation. It will also be seen that with the device a simple diametric balance may be accomplished as well as a balance against what is known as a couple.

The invention having been set forth what is claimed as new and useful is:

1. A device for determining the unbalance of a wheel mounted on an axle spindle with the axis of the spindle and wheel in substantially a horizontal plane and the position to apply a weight to the wheel to correct said unbalance, said device comprising an elongated member extending diametrically across the wheel and through the axis of the wheel, means for detachably connecting the ends of said elongated member to the wheel at diametric positions to each other and spaced from the axis of the wheel in a vertical position with the unbalance weight of the wheel downwardly disposed, said elongated member being adapted to be rotated with the wheel and the unbalance of the wheel to a horizontal position, a counter-weight on said elongated member and adjustable inwardly and outwardly in relation to the axis of the wheel on said elongated member at the opposite side of the axis of the wheel from the unbalance weight of the wheel for establishing the amount of weight to be applied to the wheel to balance the unbalance of the wheel, said wheel being provided with an annular tire holding flange having a concaved inner surface, said means for attaching said elongated member to the wheel comprising spring arms carried by the ends of the elongated member, said spring arms engaging and gripping said concaved surface of the flange.

2. A device for determining the unbalance of a wheel mounted on an axle spindle with the axis of the spindle and wheel in substantially a horizontal plane and the position to apply a weight to the wheel to correct said unbalance, said device comprising an elongated member extending diametrically across the wheel and through the axis of the wheel, means for detachably connecting the ends of said elongated member to the wheel at diametric positions to each other and spaced from the axis of the wheel in a vertical position with the unbalance weight of the wheel downwardly disposed, said elongated member being adapted to be rotated with the wheel and the unbalance of the wheel to a horizontal position, a counter-weight on said elongated member and adjustable inwardly and outwardly in relation to the axis of the wheel on said elongated member at the opposite side of the axis of the wheel from the unbalance weight of the wheel for establishing the amount of weight to be applied to the wheel to balance the unbalance of the wheel, said means for detachably attaching the elongated member to the wheel comprising spring arms carried by the ends of the elongated member, transverse rigid pins carried by the ends of the spring arms, said wheel being provided with an annular flange having a concave inner surface and the ends of said transverse pins engaging and biting into the concaved surface of the wheel flange.

3. A device for determining the unbalance of a wheel mounted on an axle spindle with the axis of the spindle and wheel in substantially a horizontal plane and the position to apply a weight to the wheel to correct said unbalance, said device comprising an elongated member extending diametrically across the wheel and through the axis of the wheel, means for detachably connecting the ends of said elongated member to the wheel at diametric positions to each other and spaced from the axis of the wheel in a vertical position with the unbalance weight of the wheel downwardly disposed, said elongated member being adapted to be rotated with the wheel and the unbalance of the wheel to a horizontal position, a counter-weight on said elongated member and adjustable inwardly and outwardly in relation to the axis of the wheel on said elongated member at the opposite side of the axis of the wheel from the unbalance weight of the wheel for establishing the amount of weight to be applied to the wheel to balance the unbalance of the wheel, a cross bar carried by the elongated member at a right angle thereto, said cross bar terminating in marker guides disposed at sixty degrees in relation to the elongated member and in radial relation to the center of the wheel, said cross bar being horizontally disposed across the elongated member between the axis of the wheel and the upper end of the elongated member when the elongated member is in vertical position and the unbalance of the wheel at the bottom of the wheel in alignment with the vertically disposed elongated member.

4. A device for determining the unbalance of a wheel mounted on an axle spindle with the axis of the spindle and wheel in substantially a horizontal plane and the position to apply a weight to the wheel to correct said unbalance, said device comprising an elongated member extending diametrically across the wheel and through the axis of the wheel, means for detachably connecting the ends of said elongated member to the wheel at diametric positions to each other and spaced from the axis of the wheel in a vertical position with the unbalance weight of the wheel downwardly disposed, said elongated member being adapted to be rotated with the wheel and the unbalance of the wheel to a horizontal position, a counter-weight on said elongated member and adjustable inwardly and outwardly in relation to the axis of the wheel on said elongated member at the opposite side of the axis of the wheel from the unbalance weight of the wheel for establishing the amount of weight to be applied to the wheel to balance the unbalance of the wheel, a horizontally disposed cross bar carried by the elongated member at a right angle thereto when the elongated member is in vertical position and the unbalance of the wheel is downwardly disposed in relation to the vertically disposed elongated member and detachably connected to the elongated member, said cross bar terminating in outwardly inclined arms having marker guides at one hundred and twenty degrees from each other and in radial relation to the center of the wheel.

5. A device for determining the unbalance of a wheel mounted on an axle spindle with the axis of the spindle and wheel in substantially a horizontal plane and the position to apply a weight to the wheel to correct said unbalance, said device comprising an elongated member extending diametrically across the wheel and through the axis of the wheel, means for detachably connecting the ends of said elongated member to the wheel at diametric positions to each other and spaced from the axis of the wheel in a vertical position with the unbalance weight of the wheel downwardly disposed, said elongated member being adapted to be rotated with the wheel and the unbalance of the wheel to a horizontal position, a counter-weight on said elongated member and adjustable inwardly and outwardly in relation to the axis of the wheel on said elongated member at the opposite side of the axis of the wheel from the unbalance weight of the wheel for establishing the amount of weight to be applied to the wheel to balance the unbalance of the wheel, said elongated member being provided with a center mark, said means for detachably connecting said elongated member to the wheel comprising spring arms carried by the ends of the elongated member, said spring arms interengaging with the wheel for supporting the elongated member and centering said center mark on the axis of the wheel.

CLARENCE M. JONES.

REFERENCES CITED

The following references are of record in the file of this patent:

UNITED STATES PATENTS

| Number | Name | Date |
|---|---|---|
| 421,271 | Griffin | Feb. 11, 1890 |
| 2,201,982 | Bazarek | May 28, 1940 |
| 2,475,502 | Holmes | July 5, 1949 |